(12) United States Patent
Householder et al.

(10) Patent No.: US 9,719,662 B1
(45) Date of Patent: Aug. 1, 2017

(54) THIN-FORM LENS FOR VOLUME LIGHTING APPLICATIONS

(71) Applicant: Universal Lighting Technologies, Inc., Madison, AL (US)

(72) Inventors: John R. Householder, Cedar Park, TX (US); Peter A. Phillips, Jr., Austin, TX (US)

(73) Assignee: Universal Lighting Technologies, Inc., Madison, AL (US)

( * ) Notice: Subject to any disclaimer, the term of this patent is extended or adjusted under 35 U.S.C. 154(b) by 118 days.

(21) Appl. No.: 14/878,436

(22) Filed: Oct. 8, 2015

Related U.S. Application Data

(60) Provisional application No. 62/061,175, filed on Oct. 8, 2014.

(51) Int. Cl.

| | |
|---|---|
| *F21V 13/04* | (2006.01) |
| *F21V 5/04* | (2006.01) |
| *G02B 17/00* | (2006.01) |
| *F21S 8/04* | (2006.01) |
| *F21V 7/00* | (2006.01) |
| *F21Y 103/00* | (2016.01) |

(52) U.S. Cl.
CPC ............ *F21V 13/04* (2013.01); *F21S 8/04* (2013.01); *F21V 5/045* (2013.01); *F21V 7/0033* (2013.01); *G02B 17/006* (2013.01); *F21Y 2103/003* (2013.01)

(58) Field of Classification Search
CPC ........ F21V 13/04; F21V 5/045; F21V 7/0033; F21S 8/04; G02B 17/006; F21Y 2103/003
USPC ............... 362/299, 311.02, 311.01, 308, 309
See application file for complete search history.

(56) References Cited

U.S. PATENT DOCUMENTS

| | | | | |
|---|---|---|---|---|
| 4,823,246 | A * | 4/1989 | Dilouya | F21S 48/24 |
| | | | | 362/296.07 |
| 5,676,453 | A * | 10/1997 | Parkyn, Jr. | G02B 19/0028 |
| | | | | 362/260 |
| 7,559,672 | B1 | 7/2009 | Parkyn et al. | |
| 8,602,604 | B2 | 12/2013 | Zhang et al. | |
| 2013/0176722 | A1* | 7/2013 | Lay | F21S 8/04 |
| | | | | 362/231 |
| 2013/0208457 | A1 | 8/2013 | Durkee et al. | |
| 2015/0085513 | A1* | 3/2015 | Spinger | F21S 48/2243 |
| | | | | 362/522 |

(Continued)

*Primary Examiner* — Laura Tso
(74) *Attorney, Agent, or Firm* — Patterson Intellectual Property Law, PC; Mark J. Patterson; Jerry Turner Sewell (57) ABSTRACT

A lighting apparatus includes a light source located on a centerline, a light redirecting lens positioned to receive light from the light source, and an outer reflector that receives light redirected by the redirecting lens. The redirecting lens includes an inner reflecting portion that includes a total internal reflection (TIR) surface that reflects light outward to an outer refracting portion. The outer refracting portion of the redirecting lens refracts the light outward and away from the position of the light source. The outer reflector receives the refracted light and reflects the inward toward the centerline and farther away from the light source. The lighting apparatus further includes a diffuser that diffuses the light from the outer reflector. The lighting apparatus may be configured longitudinally or may be configured to be rotationally symmetrical with respect to the centerline.

15 Claims, 8 Drawing Sheets

(56) References Cited

U.S. PATENT DOCUMENTS

| | | | |
|---|---|---|---|
| 2015/0241028 A1* | 8/2015 | Nakamura | F21V 3/02 362/309 |
| 2015/0247621 A1* | 9/2015 | Nakamura | F21V 5/045 362/309 |
| 2016/0054502 A1* | 2/2016 | Sun | G02B 6/0025 362/235 |
| 2016/0059873 A1* | 3/2016 | Temming | G08G 1/095 246/473.3 |
| 2016/0138777 A1* | 5/2016 | Shen | F21K 9/233 362/308 |

* cited by examiner

THIN-FORM LENS FOR VOLUME LIGHTING APPLICATIONS

CROSS-REFERENCES TO RELATED APPLICATIONS

This application claims benefit of the following patent application which is hereby incorporated by reference: U.S. Provisional Patent Application No. 62/061,175 filed Oct. 8, 2014, entitled "Thin-Form Lens for Volume Lighting Applications."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention pertains generally to light apparatuses and more particularly to devices for providing aesthetically pleasing lighting in a volumetric setting (e.g., lighting for an office or other defined space).

For many environments, such as in offices or similar environments, it is desirable to have lighting concentrated over particular work areas rather than having an entire volumetric space being lighted with evenly distributed lighting. This allows the occupants of the office to have adequate lighting for tasks without incurring the costs of lighting the entire office space with the same intensity of light. Overhead lighting fixtures, such as conventional troffers, usually generate light over a wide angular range and thus provide lighting to areas where the lighting is not needed or desired.

A need exists for an improved overhead lighting fixture that concentrates the light from a light source over a limited angular range.

BRIEF SUMMARY OF THE INVENTION

An aspect of the invention in accordance with embodiments disclosed herein is a lens for redirecting light from a light source positioned in a plane and along a centerline wherein the centerline is normal to the plane. The lens comprises a reflecting portion having an inner surface and an outer surface. The inner surface comprises a plurality of stepped refracting surfaces parallel to the plane. The plurality of refracting surfaces include at least a first refracting surface and a last refracting surface. The first refracting surface extends from the centerline at a first distance from the plane. Each subsequent refracting surface is positioned farther from the centerline and farther from the plane. The outer surface comprises at least one curved segment. The at least one curved segment has a first end at the centerline at a selected first lens thickness from the first step and has a second end positioned farther from the centerline and farther from the plane than the first end. The second end of the curved segment is spaced apart from the last refracting surface of the inner surface by a second lens thickness. The outer surface has at least one curvature selected such that light from the light source incident on the inner surface is refracted by the inner surface and is totally internally reflected by the outer surface. The lens further includes a refracting portion having an inner surface and an outer surface. The refracting portion extends from the reflecting portion in a first direction away from the centerline and in a second direction toward the plane with the inner surface facing toward the centerline.

In certain embodiments in accordance with this aspect, the second thickness of the reflecting portion of the lens is greater than the first thickness. In certain embodiments, the inner surface of the refracting portion is curved to form a concave surface facing the centerline. In certain embodiments, the outer surface of the refracting portion is parallel to the inner surface of the refracting portion. In certain embodiments, the lens is a longitudinal lens having a substantially constant profile along the length of the lens. In certain embodiments, the lens is longitudinal lens, which is symmetrical about a plane through the centerline. In certain embodiments, the lens is a rotationally symmetrical lens defined about the centerline. In certain embodiments, the at least one curved segment of the outer surface of the reflecting portion comprises a plurality of arcuate segments, wherein each arcuate segment has a respective arcuate radius and a respective arcuate length selected to redirect light incident on the respective arcuate segment in a direction approximately perpendicular to the centerline. In certain embodiments, adjacent arcuate segments are mutually tangential.

Another aspect of the invention in accordance with embodiments disclosed herein is a lighting apparatus that comprises at least one light source. The light source has at least one emission surface in a plane and emits light in directions centered about a centerline. The lighting apparatus further comprises a lens positioned with respect to the light source. The lens comprises a reflecting portion having an inner surface and an outer surface. The inner surface comprises a plurality of stepped refracting surfaces parallel to the plane. The plurality of refracting surfaces includes at least a first refracting surface and a last refracting surface. The first refracting surface extends from the centerline at a first distance from the plane. Each subsequent refracting surface is positioned farther from the centerline and farther from the plane. The outer surface of the reflecting portion of the lens comprises at least one curved segment. The at least one curved segment has a first end at the centerline at a selected first lens thickness from the first step and has a second end positioned farther from the centerline and farther from the plane than the first end. The second end of the curved segment is spaced apart from the last refracting surface of the inner surface by a second lens thickness. The outer surface has at least one curvature selected such that light from the light source incident on the inner surface is refracted by the inner surface and is totally internally reflected by the outer surface. The light is emitted from the reflecting portion as reflected light. The lens further includes a refracting portion having an inner surface and an outer surface. The refracting portion extends from the reflecting portion in a first direction away from the centerline and in a second direction toward the plane such that the inner surface of the refracting portion faces toward the centerline. The refracting portion receives the reflected light emitted from the reflecting portion and redirects the light away from the centerline and away from the plane. The lighting apparatus further includes an outer reflector having an inner reflective surface. The inner reflective surface is positioned to receive light from the refracting portion of the lens and to reflect the light received from the refracting portion in directions toward the centerline and away from the plane.

In certain embodiments in accordance with this aspect, the lighting apparatus includes a diffuser positioned to receive and diffuse light from the outer reflector. In certain embodiments, the light source comprises a plurality of light-emitting diodes, which are spaced apart longitudinally along a planar lighting module. In such embodiments, the light redirecting lens and the outer reflector extend longitudinally parallel to the planar lighting module. In certain embodiments, the lens is rotationally symmetrical about the centerline. In certain embodiments, the outer reflector is also rotationally symmetrical about the centerline.

Another aspect of the invention in accordance with embodiments disclosed herein is a lens for redirecting light from a light source, wherein the light source has an emission surface positioned in an emission plane and is positioned with respect to a centerline normal to the emission plane, and wherein the light source emits light in an emission pattern with respect to the centerline. The lens comprises a reflecting portion positioned with respect to the centerline. The reflecting portion has a first end and a second end. The reflecting lens portion comprises an inner surface having a profile comprising a plurality of steps between the first end and the second end of the reflecting portion. A first step is proximate to the first end and extends in a first direction away from the centerline at a first distance from the emission plane. Each subsequent step is positioned farther from the centerline and farther from the emission plane than a preceding step. The reflecting portion of the lens further comprises an outer surface having a profile comprising at least one curved segment between the first end and the second end of the reflecting portion. The at least one curved segment starts proximate to the centerline at the first end of the reflecting portion at a second distance from the emission plane. The second distance is greater than the first distance. The at least one curved segment extends away from the centerline and away from the emission plane toward the second end of the reflecting portion. The at least one curved segment has at least one curvature selected with respect to the inner surface of the reflecting portion to cause light from the light source passing through the steps of the inner surface and incident on the outer surface to incur total internal reflection (TIR) at the outer surface and to be reflected as reflected light in the second direction away from the centerline. The lens further comprises a refracting portion having a first end proximate to the second end of the reflecting portion and having a second end. The second end of the refracting portion is positioned farther from the centerline and closer to the emission plane than the first end of the refracting portion. The refracting portion has a curved inner surface and a curved outer surface. The inner surface and the outer surface of the refracting portion are spaced apart. Each of inner surface and the outer surface of the refracting portion is concave with respect to the light source. The refracting portion refracts the reflected light from the reflecting portion and directs the light away from the centerline and away from the plane of the light source.

Another aspect of the invention is a lighting apparatus. The apparatus includes a light source located on a centerline, a light redirecting lens positioned to receive light from the light source, and an outer reflector that receives light redirected by the redirecting lens. The redirecting lens includes an inner reflecting portion that includes a total internal reflection (TIR) surface that reflects light outward to an outer refracting portion. The outer refracting portion of the redirecting lens refracts the light outward and away from the position of the light source. The outer reflector receives the refracted light and reflects the inward toward the centerline and farther away from the light source. The lighting apparatus further includes a diffuser that diffuses the light from the outer reflector. The lighting apparatus may be configured longitudinally or may be configured to be rotationally symmetrical with respect to the centerline.

DETAILED DESCRIPTION OF THE INVENTION

In the following description, various dimensional and orientation words, such as height, width, length, longitudinal, horizontal, vertical, up, down, left, right, tall, low profile, and the like, may be used with respect to the illustrated drawings. Such words are used for ease of description with respect to the particular drawings and are not intended to limit the described embodiments to the orientations shown. It should be understood that the illustrated embodiments can be oriented at various angles and that the dimensional and orientation words should be considered relative to an implied base plane that would rotate with the embodiment to a revised selected orientation.

Figures 1, 2, 3:
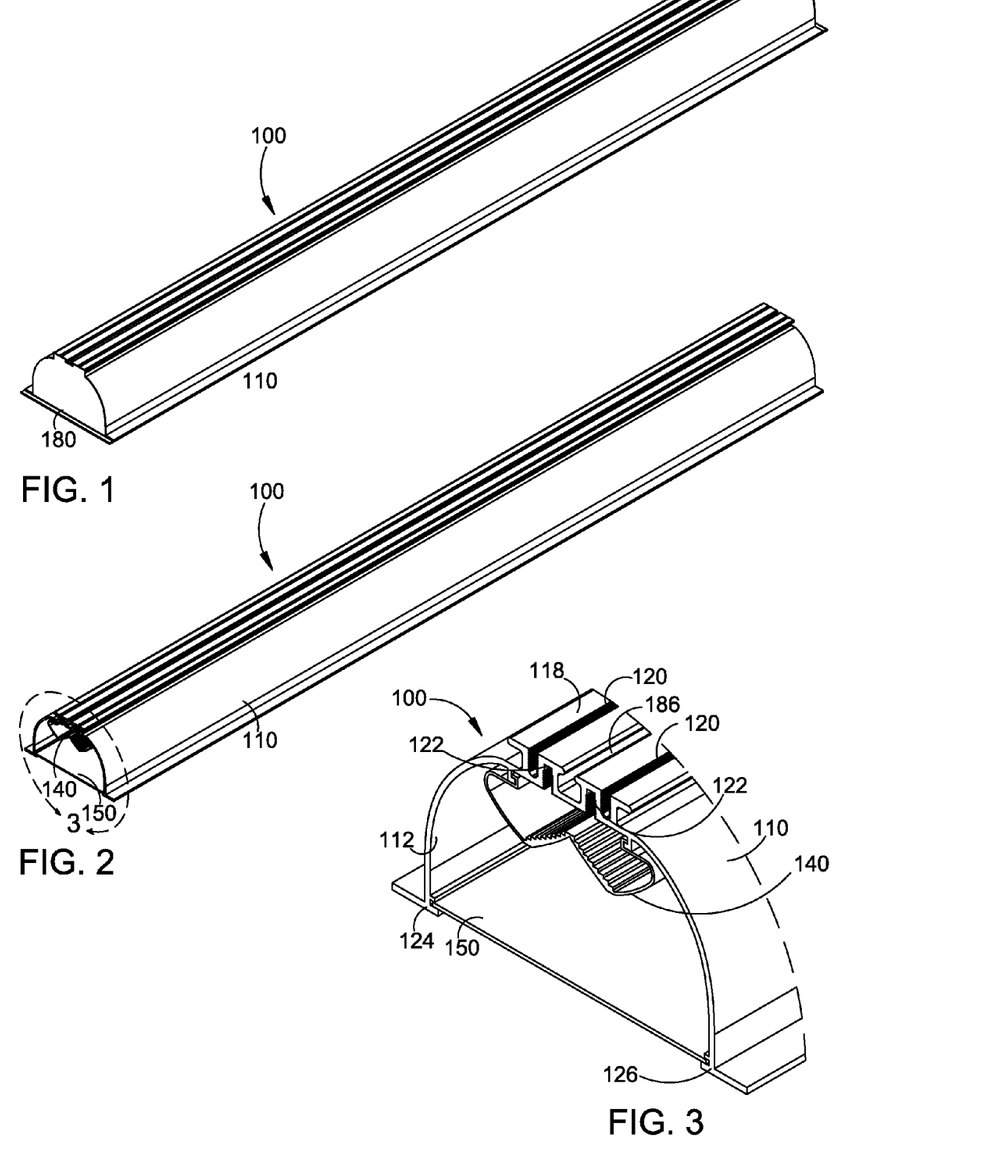
FIG. 1 illustrates a top perspective view of a lighting apparatus that provides light over a limited angular range.
FIG. 2 illustrates the lighting apparatus of FIG. 1 with an end cap removed to show the light redirection lens within the lighting apparatus.
FIG. 3 illustrates an enlarged view of the end of the lighting apparatus of FIG. 2 within the area —3— of FIG. 2.

FIGS. 1-9 illustrate a lighting apparatus 100 in accordance with an embodiment of the present invention. FIG. 1 illustrates a top perspective view of the lighting apparatus, which comprises an outer reflector 110 having an inner surface 112 and an outer surface 114 (see FIG. 9). The outer reflector also serves as a mounting structure for the lighting apparatus. For example, mounting fasteners (e.g., screws, not shown) can extend through an upper portion 116 of the mounting structure into an apparatus support (not shown) in the ceiling of an office or other volume to be illuminated. In the illustrated embodiment, the outside of the upper portion of the outer reflector has a first set of outer engagement slots 120 that receive mounting hardware (not shown) that extend along the longitudinal length of the outer reflector. The inside of the upper portion includes a set of inner engagement slots 122 that receive mounting hardware (not shown) for the lighting source (described below). In the illustrated embodiment, the outer reflector has the general shape of an upside-down "U." When oriented as shown in FIG. 1, two lower ends 124, 126 of the outer reflector, corresponding to the two ends of the "U," face downward. In one embodiment, the outer reflector comprises a reflective material such as aluminum.

The lighting apparatus 100 further includes a lighting source 130, which is mounted to the inner surface 112 of the outer reflector 110 proximate to the upper portion 116. In the illustrated embodiment, the lighting source comprises a first elongated strip 132 and a second elongated strip 134. The first elongated strip is shown in an enlarged view if FIG. 6. The second elongated strip has the same or substantially the same structure as the first elongated strip. Each elongated strip comprises a plurality of light-emitting diodes (LEDs) 136, which are spaced apart linearly along the length of the elongated strip. The LEDs are provided with power in a conventional manner by a power supply (not shown) and supply wiring connectable to source (not shown) of electrical energy.

A light redirecting lens 140 is secured to inner surface 112 of the outer reflector 110 below the lighting source 130. As shown in the elevational profile view in FIG. 9, the light directing lens includes a first mounting tab 142 and a spaced apart second mounting tab 144 that are inserted into a respective first tab receiving slot 146 and a second tab receiving slot 148 of the outer reflector. The two tab receiving slots are positioned below and parallel to the inner surface at the upper portion of the outer reflector. In the illustrated embodiment, the light redirecting lens comprises an optically clear plastic material such as acrylic. Accordingly, the two tabs of the lens can be flexed toward each other temporarily to allow the tabs to be inserted into the slots. The resilience of the plastic material causes the tabs to remain within the slots when the lens is no longer flexed. The lens is extruded, molded or otherwise formed into the longitudinal lens configuration shown in FIGS. 4 and 5. In the illustrated embodiment, the lens is formed into a length of approximately 48 inches to conform to the length of the outer reflector 110. The lens may be made shorter or longer in accordance with the desired overall length of the lighting apparatus 100.

Figure 4:
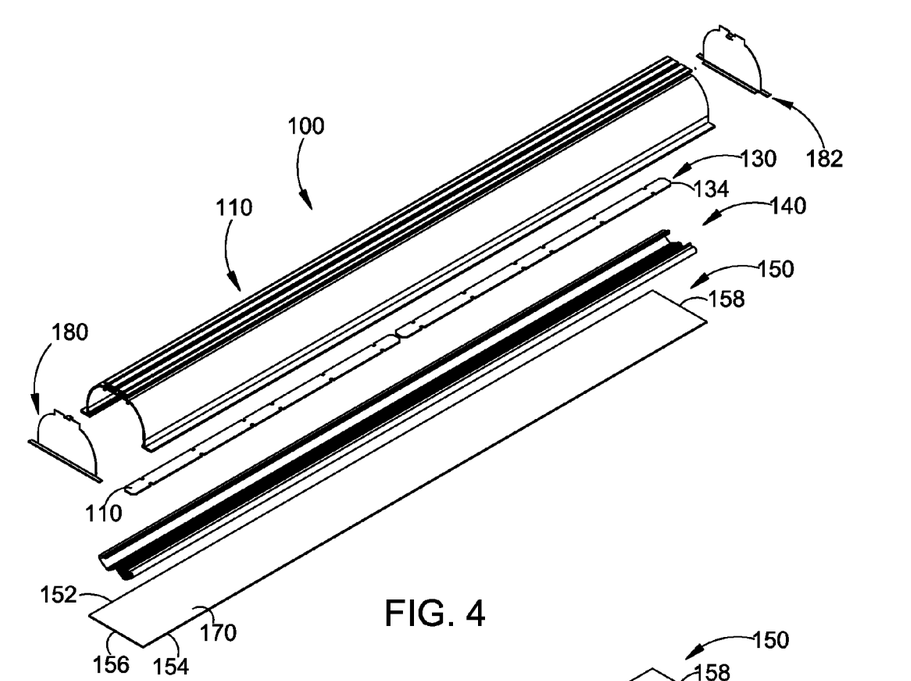
FIG. 4 illustrates an exploded perspective view of the lighting apparatus of FIG. 1 looking down at the top of the lighting apparatus, the view showing the outer reflector, the LED modules, the inner light redirecting lens, the diffuser and the two end caps.
Figure 5:
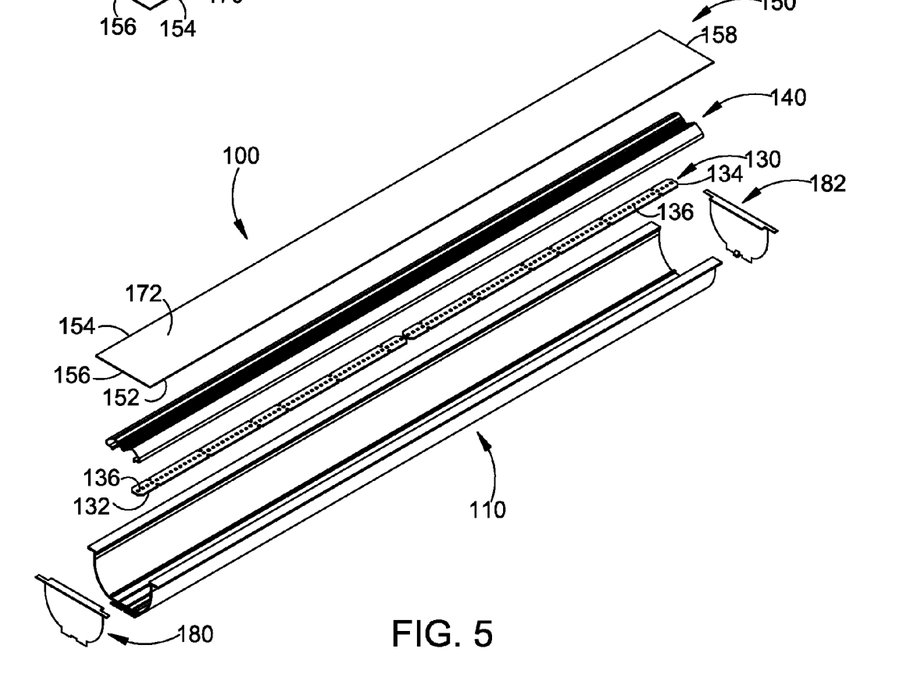
FIG. 5 illustrates an exploded perspective view of the lighting apparatus of FIG. 1 similar to the view of FIG. 4 but with the components rotated to show the LEDs on the LED modules.
Figure 6:
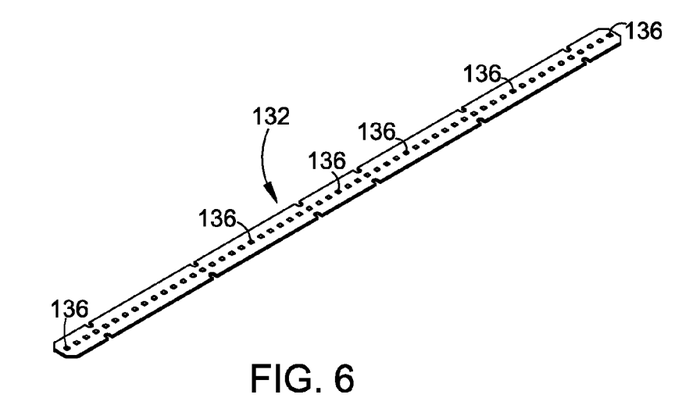
FIG. 6 illustrates an enlarged perspective view of one of the LED modules in FIG. 5.

A diffuser 150 is positioned near the two ends 124, 126 of the outer reflector 110. As shown in FIGS. 4 and 5, the diffuser includes a first longitudinal edge 152, a parallel second longitudinal edge 154, a first end 156 and second end 158. The outer reflector includes a first inwardly facing protrusion 160 and a second inwardly facing protrusion 162 near each of the two lower ends 124, 126 of the outer reflector. A first diffuser mounting slot 164 is formed in the first protrusion; and a second diffuser mounting slot 166 is formed in the second protrusion. The two mounting slots extend longitudinally inward from the inner surface 112 of the outer reflector. Each of the first and second longitudinal edges of the diffuser is inserted into a respective one of the two diffuser mounting slots. The diffuser can be slid into the slots from one end of the outer reflector. Alternatively, the ends of outer reflector can be forced apart temporarily by a sufficient distance to allow insertion of the edges of the diffuser into the diffuser mounting slots. The resilience of the outer reflector causes the diffuser mounting slots to retain the diffuser after the ends of the outer reflector are allowed to return toward their original positions. The diffuser is positioned in the outer reflector with an upper surface 170 of the diffuser directed upward towards the LEDs 136 and with a lower surface 172 directed away from the LEDs.

Figure 7:
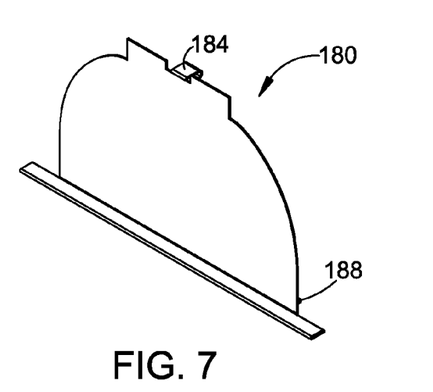
FIG. 7 illustrates an enlarged perspective view of the outside of the first end cap of the lighting apparatus of FIG. 4, the outside of the second end cap being the mirror image of the outside of the first end cap.
Figure 8:
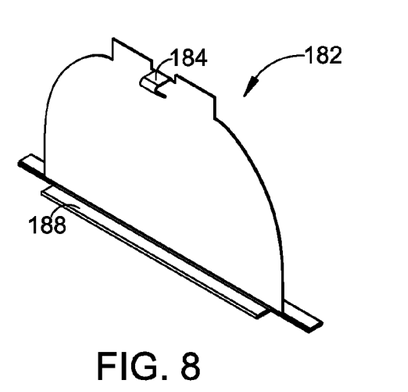
FIG. 8 illustrates an enlarged perspective view of the inside of the second end cap of the lighting apparatus of FIG. 4, the inside of the first end cap being the mirror image of the inside of the second end cap.

The lighting apparatus further includes a first end cap 180 and a second end cap 182, which are substantially the same. As shown in FIG. 7 for the first end cap and as shown in FIG. 8 for the second end cap, each end cap has a shape similar to the shape of the outer surface 114 of the outer reflector 110. An upper end of each end cap includes a resilient tab 184 that is sized and positioned to be inserted into a tab receiving slot 186 (FIG. 3) on the outer surface of the upper portion 116 of the outer reflector. When positioned in the respective slot, each tab frictionally engages the slot to retain the respective end cap in a position proximate to the respective end of the outer reflector. Each end cap further includes an inwardly facing ledge 188 that has a width selected to fit between the two ends 124, 126 of the outer reflector and to be positioned below the two protrusions 160, 162. Preferably, each ledge frictionally engages a lower surface of the protrusions to assist in securing the end caps to the outer reflector.

Figure 10:
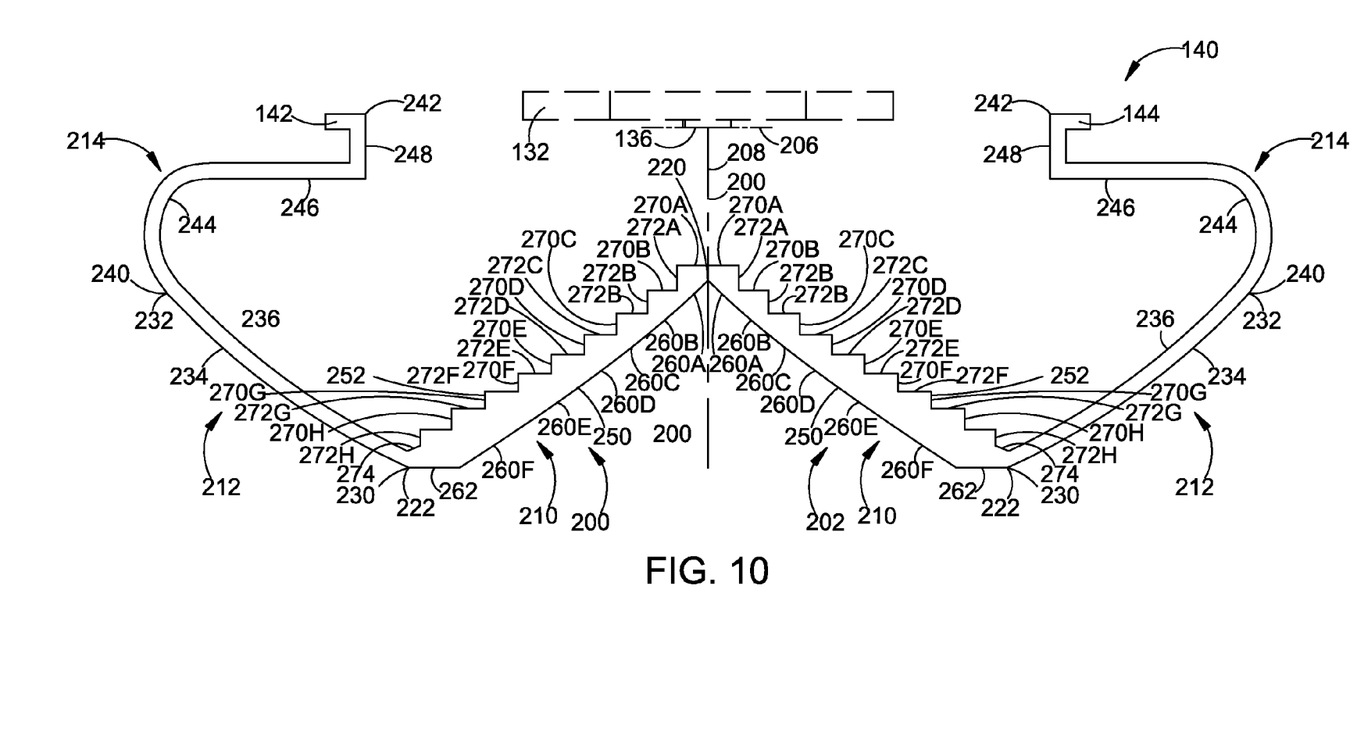
FIG. 10 illustrates an enlarged elevational end view of the light redirecting lens of FIG. 9 with the LED module shown in dashed lines as a reference.

FIG. 10 illustrates an enlarged end view of the light redirecting lens 140. Accordingly, FIG. 10 is also a profile of the light redirecting lens. In FIG. 10, one of the LEDs 136 is shown in dashed lines to illustrate the relationship of the elements of the light redirecting lens with respect to the LED. In the illustrated embodiment, the light redirecting lens is symmetrical with respect to a centerline 200 that extends vertically through the emission center of the LED. Accordingly, the light redirecting lens comprises a first lens half 202 to the left of the centerline and a second lens half 204 to the right of the centerline. The LED preferably emits light in a symmetrical emission pattern with respect to the centerline. The emission surface of the LED defines a horizontal plane 206. In the longitudinally extending embodiment of the lens illustrated in FIGS. 2-5, the centerline represents the edge of a vertical plane 208 that extends along the centerlines of the LEDs 136 in FIG. 5. Thus, the two lens halves are symmetrical about the vertical plane.

Each lens half 202, 204 of the light redirecting lens comprises a reflecting portion 210, a refracting portion 212 and a support portion 214. The reflecting portion of each lens half extends from a first common first end 220 to a respective second end 222. The common first end is proximate to the centerline 200. The respective second end is approximately 0.868 inch vertically below the emission center of the LED 136 and approximately 0.763 horizontally from the centerline. The reflecting portion extends downwardly at an angle of approximately 32 degrees to the second end.

The refracting portion 212 of each lens half 202, 204 extends from a respective first end 230 to a respective second end 232. The first end of the refracting portion is coincident with the second end 222 of the reflecting portion. The refracting portion extends upwardly at an angle of approximately 37 degrees with respect to horizontal from the first end of the refracting portion to the second end of the refracting portion. The refracting portion has an outer surface 234 having a radius of approximately 1.88 inches and having an arcuate length of approximately 0.764 inch. The refracting portion has an inner surface 236, which is substantially parallel to the outer surface. The inner and outer surfaces of the refracting portion generally face the LED 136 and the centerline and are concave with respect to the LED and the centerline.

The connecting portion 214 has a first end 240 and a second end 242. The first end of the connecting portion is coincident with the second end 232 of the refracting portion 212. The second end of the connecting portion of each half 202, 204 of the light redirecting lens 140 couples to a respective one of the first mounting tab 142 and the second mounting tab 144. In the illustrated embodiment, each connecting portion includes a curved segment 244 that is tangential to the second end of the refracting portion and that curves inwardly toward the centerline to intersect a generally horizontal segment 246. The horizontal segment is directed inward to intersect a vertical segment 248. The vertical segment of each half of the light redirecting lens is connected to the respective mounting tab.

As further shown in FIG. 10, the reflecting portion 210 comprises an outer surface 250 and an inner surface 252. The outer surface comprises a plurality of interconnected first through sixth arcuate segments 260A-F starting with the first arcuate segment 260A at the first end 220. The last (sixth) arcuate segment 260F is connected via a horizontal segment 262 to the second end 222 of the reflecting portion. In the illustrated embodiment, six arcuate segments define the outer surface. The arcuate segments have varying radiuses arcuate lengths. In the illustrated embodiment, the first segment has a radius of approximately 1.71 inches and an arcuate length of approximately 0.098 inch; the second segment has a radius of approximately 2.38 inches and an arcuate length of approximately 0.105 inch; the third segment has a radius of approximately 3.08 inches and an arcuate length of approximately 0.111 inch; the fourth segment has a radius of approximately 3.72 inches and an arcuate length of approximately 0.09 inch; the fifth segment has a radius of approximately 7.89 inches and an arcuate length of approximately 0.186 inch; and the sixth segment has a radius of approximately 7.196 inches and an arcuate length of approximately 0.205 inch. In alternative embodiments, more or fewer arcuate segments may be used. As discussed below, the radiuses and the lengths of the segments are selected to reflect incident rays in selected directions. Preferably, each arcuate segment is tangential to each adjacent arcuate segment so that the overall curvature of the outer surface transitions smoothly from segment to segment.

The inner surface 252 of each half 202, 204 of the reflecting portion 210 of the lens 140 comprises a plurality of horizontal segments 270A-I, with each horizontal segment followed by a corresponding vertical segment 272A-I. In the illustrated embodiment, 9 pairs of horizontal and vertical segments are provided. In alternative embodiments, more or fewer pairs of segments may be provided. The final vertical segment 272I is connected by a downwardly sloping segment 274 to the second end 222 of the reflecting portion. The first horizontal segment 270A in each half of the reflecting portion is located approximately 0.353 inch from the center of emission of the LED 136. The widths of the horizontal segments vary from about 0.76 inch to about 0.086 inch and average about 0.081 inch. The heights of the vertical segments vary from about 0.043 inch to about 0.063 inch and average about 0.051 inch. The widths and heights of the segments are selected to vary modify the refraction of light rays incident on the inner surface of the reflecting portion of the lens. The sloping segment 274 has a length of approximately 0.037 inch and slopes downward at an angle of approximately 22.1 degrees with respect to horizontal.

As illustrated, the reflecting portion 210 of the lens 140 has a varying thickness between the outer surface 250 and the horizontal and vertical segments of the inner surface 252. The lens has a first vertical thickness at the centerline 200. The vertical thickness increases gradually under the first horizontal segment 270A from the centerline outward to the first vertical segment 272A. The vertical thickness decreases abruptly at the first vertical segment 272A. The vertical thickness again increases gradually under the second horizontal segment 270B from the first vertical segment to the second vertical segment 272B. The vertical thickness decreases abruptly at the second vertical segment. The gradual increases and decreases of the vertical thickness of the reflecting portion of the lens continues for each subsequent pair of horizontal and vertical segments until the last horizontal segment 270I under which the vertical thickness remains constant or substantially constant with respect to the horizontal segment 262 of the outer surface. The vertical thickness then decreases gradually over the length of the sloping segment 274. As illustrated, the average vertical thickness of the reflecting portion of the lens beneath each horizontal segment gradually increases for each sequential pair of horizontal and vertical segments up to the last horizontal segment.

In similar manner, the horizontal thickness of the reflecting portion 210 of the lens 140 between the outer surface 250 and the inner surface 252 varies. The outer surface is positioned farther away from the centerline 200 as the outer surface proceeds downward. Accordingly, the reflecting portion of the lens has a gradually decreasing horizontal thickness between the outer surface and the first vertical segment 272A beginning at the first end 220 and proceeding downward to a point on the outer surface horizontally aligned with the second horizontal segment 270B. The horizontal thickness abruptly increases at the point of alignment with the second horizontal segment. The horizontal thickness between the outer surface and the inner surface gradually decreases as the outer surface proceeds downward and away from the centerline and the inner surface proceeds downward along the second vertical segment. At a point of horizontal alignment with the third horizontal segment 270C, the horizontal thickness of the reflecting portion of the lens again abruptly increases. The gradual decreases and abrupt increases of the horizontal thickness of the reflecting portion of the lens continues for each subsequent pair of horizontal and vertical segments until the lower end of the last vertical segment 272*l*. The horizontal thickness of the reflecting portion of the lens then increases gradually over the length of the sloping segment 274. As illustrated, the average horizontal thickness of the reflecting portion of each lens half 202, 204 between the outer surface and each vertical segment gradually increases from the common first end 220 to the respective second end 222 of the reflecting portion.

Figure 11:
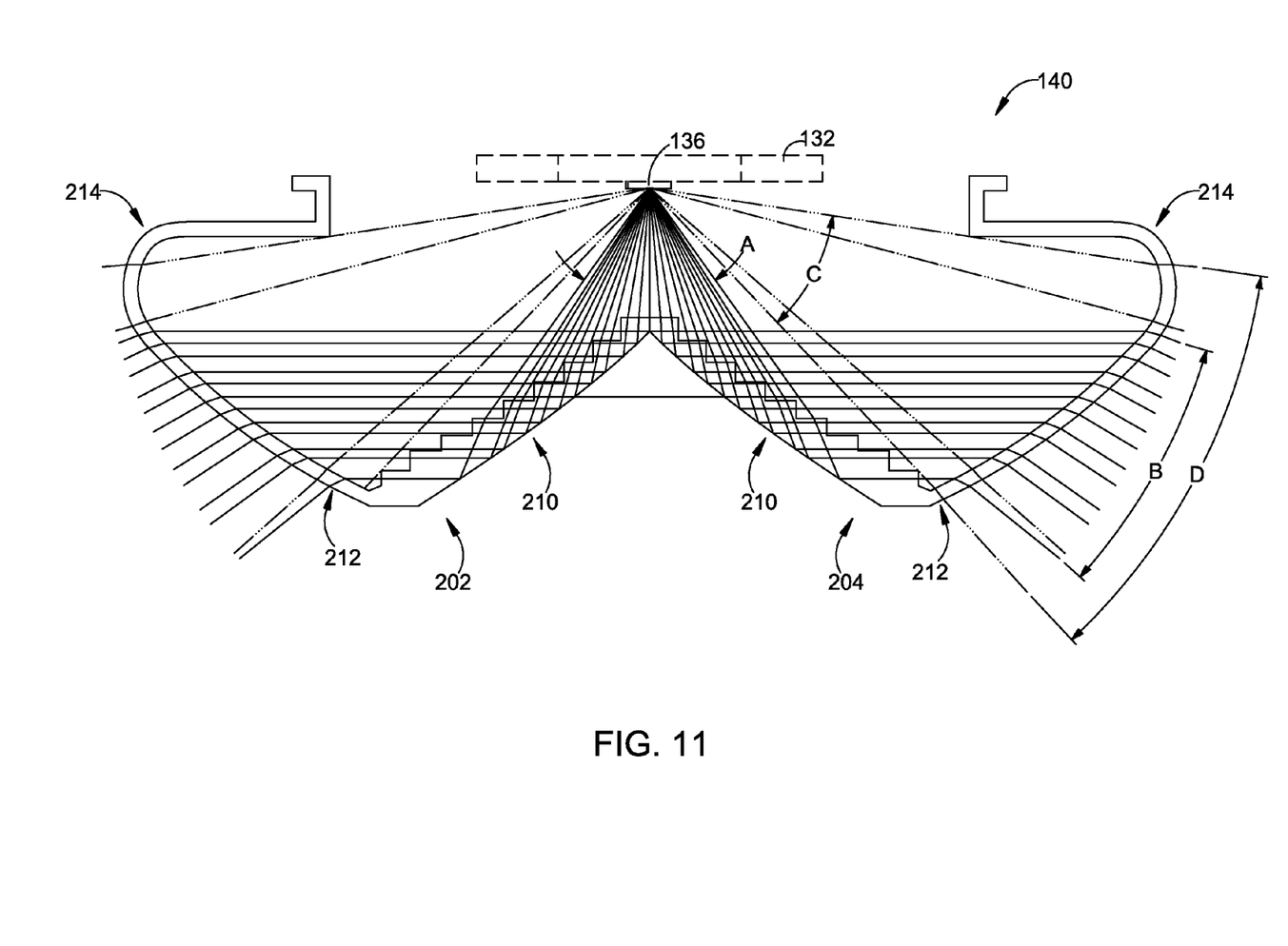
FIG. 11 illustrates the enlarged elevational view of the light redirecting lens of FIG. 10 with a plurality of light rays represented pictorially to illustrate the operation of the light redirecting lens.

As shown in FIG. 11, the light redirecting lens 140 combines the effects of the reflecting portion 210 and the refracting portion 212 to redirect light emitted from the LED 136 over a first angular range "A" of approximately 72 degrees (approximately 36 degrees on either side of the centerline 200). The light in the first angular range is represented in FIG. 11 as a plurality of rays 300. The light in the first angular range is redirected by reflection and refraction to a second angular range "B" at the outer surface 234 of the refracting portion 212 as represented by a second plurality of light rays 310 shown in solid lines in FIG. 11 for the second lens half 204. Light is emitted from a corresponding angular range (not shown) from the first lens half 202. For example, the second angular range is approximately 27 degrees on either side of the centerline. The second angular range extends from approximately 46 degrees to approximately 73 degrees with respect to the centerline for each lens half. Very little light in the first angular range "A" passes through the reflecting portion of the light redirecting lens to illuminate the area directly below the lens without being reflected and refracted before reaching the diffuser 150.

Additional light in a third angular range "C" from approximately 36 degrees to approximately 80 degrees on either side of the centerline 200 undergoes refraction only because the light propagates directly to the refracting portion 212 without being incident on the reflecting portion. Representative rays 320 that are incident directly on the refracting portion are shown in phantom lines in FIG. 11. The refraction of the third angular range of rays results in additional rays 330 in a fourth angular range "D" emitted from each lens half 202, 204 which encompasses the second angular range "B."

As shown in FIG. 11, the light rays 300 in the first angular range "A" are incident on the first six horizontal segments 270A-F of the inner surface 252 of the reflecting portion 210 of the lens 140 and undergo varying degrees of refraction. The amount of refraction depends on the angle of incidence of each ray with respect to the local normal to the inner surface of the lens. The rays having greater angular distances from the centerline 200 incur greater degrees of refraction at the surfaces of the horizontal segments. The refracted rays pass through the bulk of the refracting portion and are incident on the inside boundary of the outer surface 250. The arcuate segments 260A-F of the outer surface have radiuses and angular orientations selected in accordance with the varying angles caused by the refractions at the horizontal segments. In particular, the arcuate segments are oriented so that the rays 300 incident on the arcuate segments are incident at angles to cause total internal reflection (TIR) of the rays. The arcuate segments are further oriented so that the reflected rays are reflected at respective angels normal to the arcuate segments to cause the rays to be close to horizontal as illustrated by reflected light rays 320 in FIG. 11. Accordingly, the rays propagate toward the inner surface 236 of the refracting portion 212. The rays are initially refracted downward at the inner surface by an angular amount that varies in accordance with the angle of the inner surface with respect to the horizontal at the incidence location. After passing through the refracting portion, the rays are refracted upward by small angular amount at the outer surface 234 of the refracting portion and are emitted from the outer surface as a first set of lens output rays 330.

Figure 12:
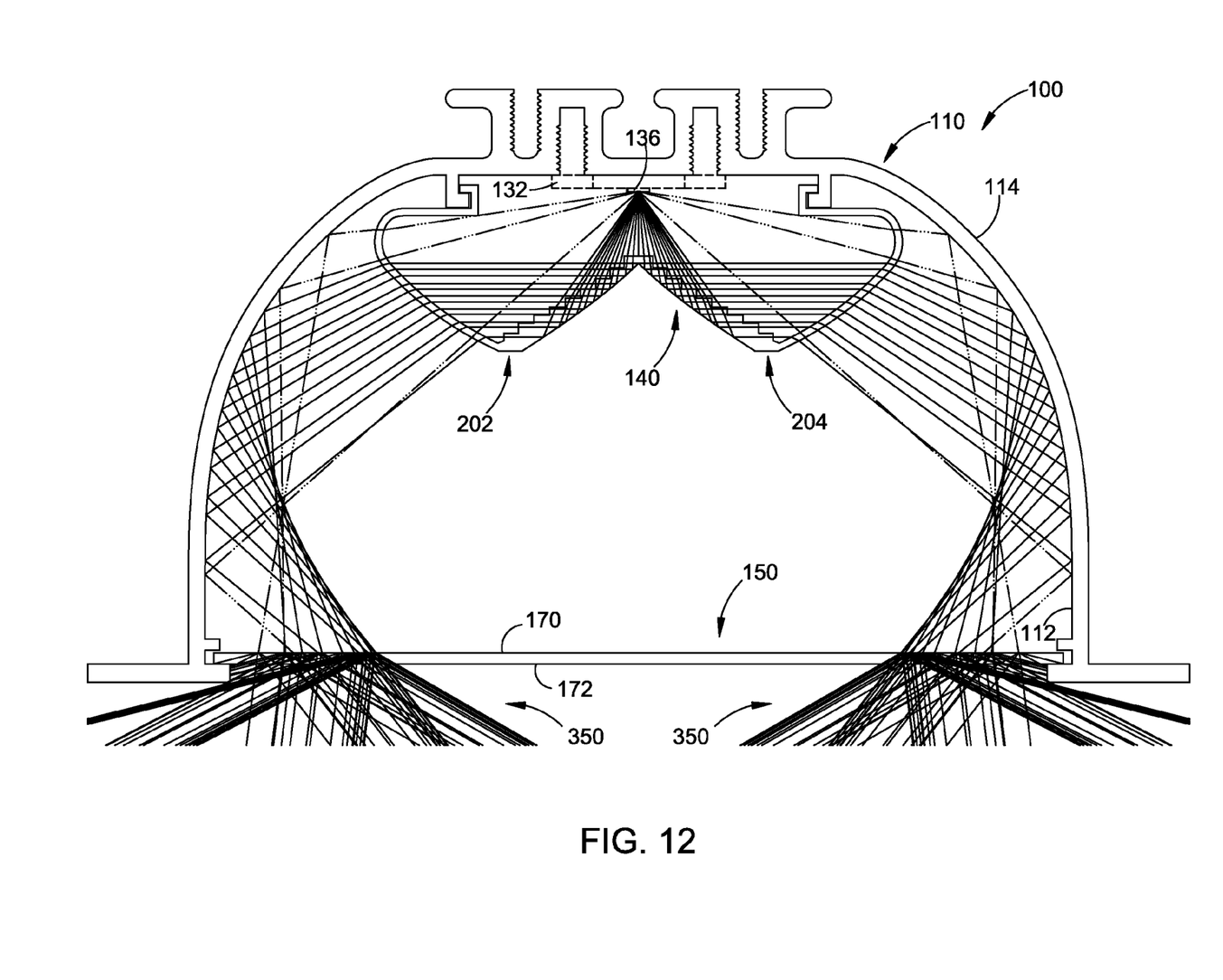
FIG. 12 illustrates the elevational end view of the lighting apparatus in accordance with FIG. 9 and further illustrates the reflection of the pattern of light rays from the light redirecting lens by the inner surface of the outer reflector.

As shown in FIG. 12, the rays 320 exiting the outer surface 234 of the refracting portion 212 of the light redirecting lens 140 are incident on the curved inner surface 112 of the outer reflector 110. The rays are reflected to produce reflected rays 340 that propagate downward around the inner perimeter of the inner surface of the outer reflector and are incident on the upper surface 170 of the diffuser 150. The rays are diffused in a conventional manner as the rays pass through the diffuser to the lower surface 172 of the diffuser as represented by a set of diffused rays 350.

The rays 310 (shown in phantom lines) from the LED 136 that are incident directly on the inner surface 236 of the refracting portion 212 also undergo refractions at the inner surface and the outer surface 234 of the refracting portion and are incident on the inner surface 112 of the outer reflector 110 at angles that cause the light to be reflected generally along the inner perimeter of the outer reflector.

As described above, the reflecting portion 210 and the refracting portion 212 direct the light from the LEDs 136 to the inner surface 112 of the outer reflector 110 at angles selected cause a substantial portion of the light from the LED to directed away from the middle of the upper surface 170 of the diffuser 150. The redirection of the light precludes a hot spot of more intense light from appearing directly below the LEDs. The diffuser diffuses the light so that a sufficient portion of the light emitted from the lower surface 172 of the diffuser is directed toward the area below the middle of the diffuser to cause the light to be sufficiently evenly distributed to achieve a desired aesthetic effect.

The above-described embodiment is a linear embodiment that extends longitudinally over a selected distance. For example, in the illustrated embodiment having the two LED lighting modules 132, 134, the overall length of the outside reflector 110 of the lighting apparatus is approximately 48 inches. The length can be reduced by approximately 50 percent by including only one of the two lighting modules.

Figure 13:
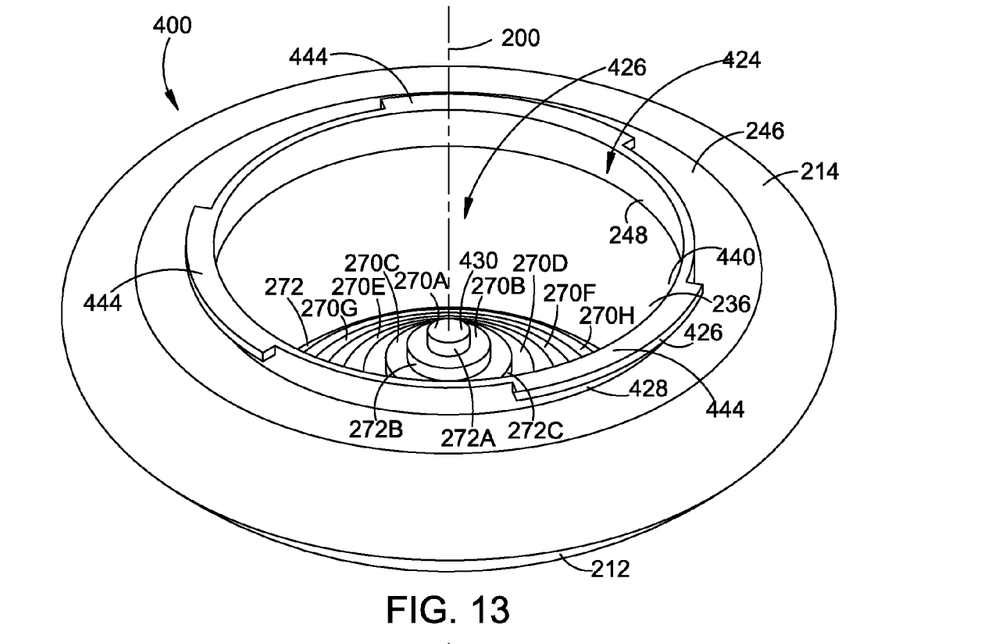
FIG. 13 illustrates a top perspective view of a rotationally symmetrical lens having the profile of FIG. 9 rotated about the centerline.
Figure 14:
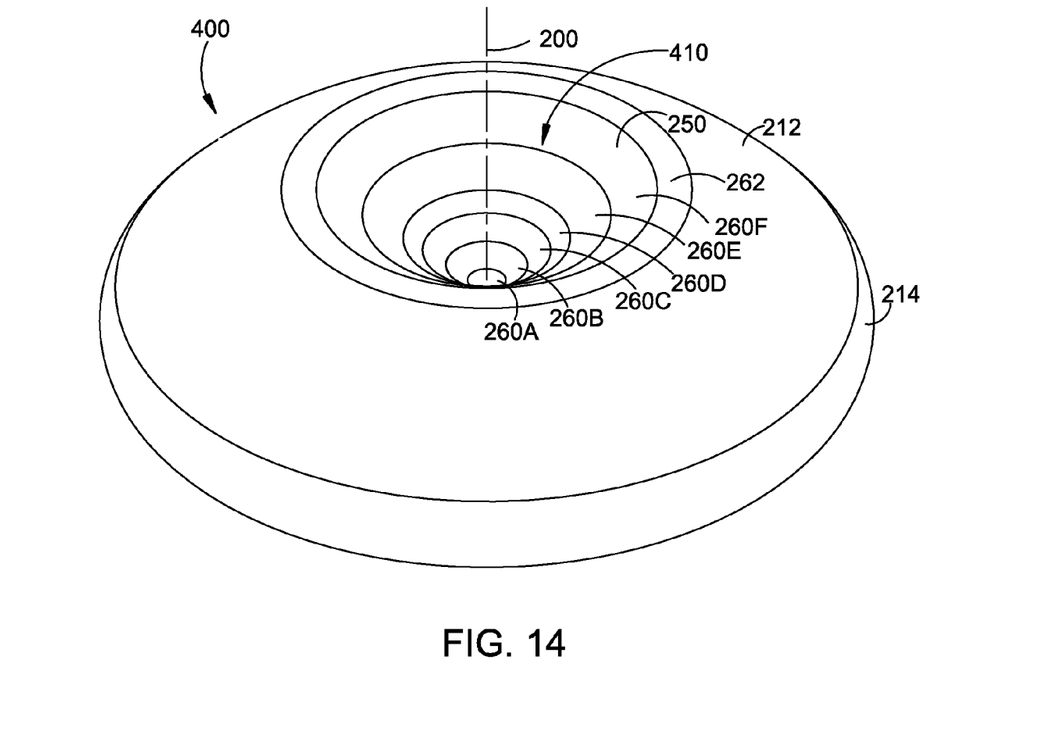
FIG. 14 illustrates a bottom perspective view of the rotationally symmetrical lens of FIG. 13.

FIGS. 13 and 14 illustrate an alternative embodiment of a rotationally symmetrical lens 400 that may be used in with a single-LED (not shown) or with a small central array of LEDs (not shown). The rotational symmetrical lens is formed by rotating the profile of the lens shown in FIG. 9 around the centerline 200. The resulting lens has a general shape of a lighting globe. Unlike a conventional lighting globe, a central lower outside portion 410 of the lens in FIGS. 13 and 14 is recessed. The recess has a composite curvature in accordance with the plurality of arcuate segments 260A-F (see FIG. 9) and the horizontal segment 262 that form the outer surface 250 of the reflecting portion 210 rotated about the centerline.

Figure 9:
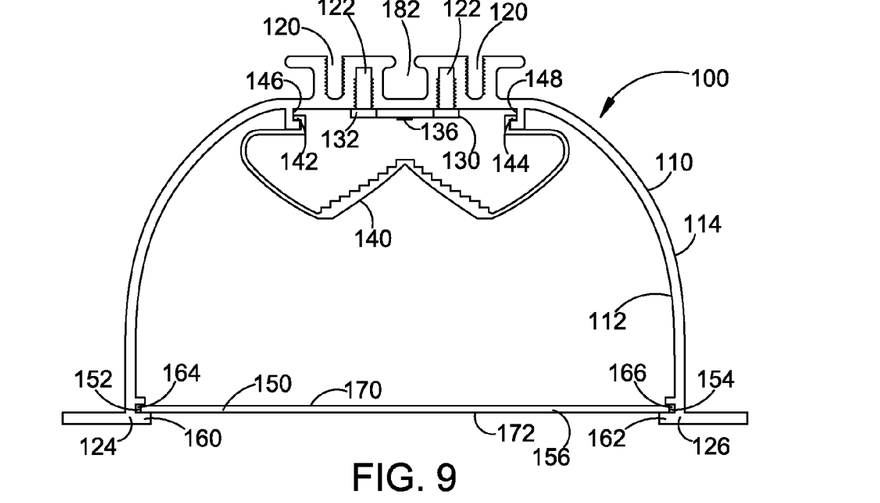
FIG. 9 illustrates an elevational end view of the lighting apparatus of FIG. 1 with the end caps removed as in FIGS. 2 and 3 showing the configuration of the light redirecting lens and the positioning of the lens with respect to the LED module and the outer reflector.

An outer perimeter 420 of the lens 400 has the combined shapes of the refracting portion 212 and the connecting portion 214 of the lens profile in FIG. 9. As illustrated, the tab 144 of FIG. 9 forms a circular ridge 422 that extends outwardly from a circular upper opening 424 into an inner cavity 426 of the lens. A recessed ring 428 extends around the top of the lens below the circular ridge.

A raised central inside portion 430 of the lens 400 rises inward towards the center of the inner cavity 426 of the lens. The raised central inside portion comprises a plurality of steps that correspond to the steps 270A-H, 272A-H (only 272A-C shown in FIG. 14) and the sloping segment 274 (see FIG. 9) rotated about the centerline 200. An inside surface 440 of the lens extends from the outer boundary of the raised central inside portion to the circular upper opening of the lens. The inside surface has a composite profile corresponding to the inside surface 236 of the reflecting portion 412, the curved segment 244, the horizontal segment 246 and the vertical segment 248 of FIG. 9. Only the inside surface of the reflecting portion is shown in FIG. 14.

Figure 15:
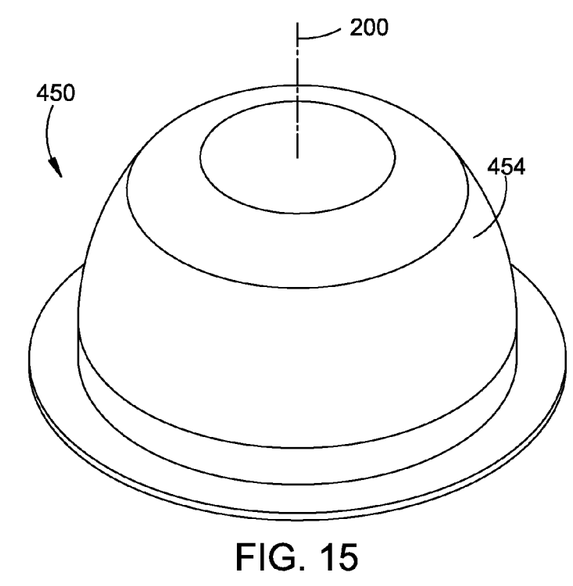
FIG. 15 illustrates a top perspective view of a rotationally symmetrical outer reflector.
Figure 16:
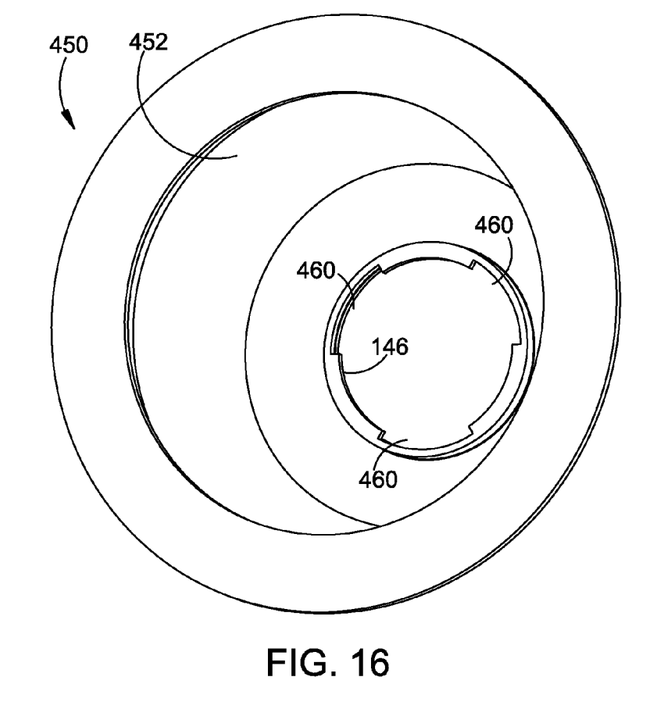
FIG. 16 illustrates an inside perspective view of the reflector of FIG. 15 showing a twist and lock mechanism to engage the lens of FIGS. 13 and 14.

The lens 400 of FIGS. 13 and 14 is installable over an LED (or array of LEDs) 136 by engaging the circular ridge 422 with an engagement device (not shown) of a fixture (not shown). For example, the lens may be inserted into a cylindrical fixture having a plurality (e.g., three or four) of screws. The screws can be tightened to engage the recessed ring 428 to retain the lens in the cylindrical fixture in a conventional manner. Alternatively, selected portions of the circular ridge may be removed to form a twist and lock engagement device that operates in a conventional manner. For example, the lens in FIG. 13 is shown with the circular ridge segmented into a plurality of tabs 444 that are insertable into corresponding openings of a mating structure and rotatable to engage the tabs with the mating structure. For this example, the profile of the outer reflector 110 shown in FIG. 8 is rotatable about the centerline 200 (FIG. 9) to provide an outer reflector 450 as shown in FIGS. 15 and 16 for a lighting apparatus. The outer reflector of FIGS. 15 and 16 has an inner surface 452 and an outer surface 454. The mounting structures of the previously described longitudinal outer reflector are not included in the outer reflector shown in FIGS. 15 and 16. The rotated tab receiving slot (e.g., the slot 146) on the inner surface of the outer reflector is configurable with a plurality of access openings 460 through the lower boundary of the slot. The access openings have a sufficient angular size to allow the segmented tabs of the lens to be inserted vertically through the openings and then twisted to secure the lens to the outer reflector. A circular diffuser (not shown) is installable in a lower portion of the rotationally symmetrical outer shell in a similar manner after installing the lens. Other engagement devices to couple the lens to the outer reflector or to other supporting structures may also be used.

Although there have been described particular embodiments of the present invention of a new and useful "Thin-Form Lens for Volume Lighting Applications," it is not intended that such references be construed as limitations upon the scope of this invention except as set forth in the following claims.

What is claimed is:

1. A lens for redirecting light from a light source positioned in a plane and along a centerline, the centerline normal to the plane, the lens comprising:
   a reflecting portion having an inner surface and an outer surface, wherein:
      the inner surface comprises a plurality of stepped refracting surfaces parallel to the plane, the plurality of refracting surfaces including at least a first refracting surface and a last refracting surface, the first refracting surface extending from the centerline at a first distance from the plane, each subsequent refracting surface positioned farther from the centerline and farther from the plane; and
      the outer surface comprises at least one curved segment, the at least one curved segment having a first end at the centerline at a selected first lens thickness from the first step and having a second end positioned farther from the centerline and farther from the plane than the first end, the second end of the curved segment spaced apart from the last refracting surface of the inner surface by a second lens thickness, the outer surface having at least one curvature selected such that light from the light source incident on the inner surface is refracted by the inner surface and is totally internally reflected by the outer surface; and
   a refracting portion having an inner surface and an outer surface, the refracting portion extending from the reflecting portion in a first direction away from the centerline and in a second direction toward the plane with the inner surface facing toward the centerline.

2. The lens as defined in claim 1, wherein the second thickness of the reflecting portion of the lens is greater than the first thickness.

3. The lens as defined in claim 1, wherein the inner surface of the refracting portion is curved to form a concave surface facing the centerline.

4. The lens as defined in claim 3, wherein the outer surface of the refracting portion is parallel to the inner surface of the refracting portion.

5. The lens as defined in claim 1, wherein the lens is a longitudinal lens having a substantially constant profile along the length of the lens.

6. The lens as defined in claim 1, wherein the lens is longitudinal lens, which is symmetrical about a plane through the centerline.

7. The lens as defined in claim 6, wherein the lens is a rotationally symmetrical lens defined about the centerline.

8. The lens as defined in claim 1, wherein the at least one curved segment of the outer surface of the reflecting portion comprises a plurality of arcuate segments, each arcuate segment having a respective arcuate radius and a respective arcuate length selected to redirect light incident on the respective arcuate segment in a direction approximately perpendicular to the centerline.

9. The lens as defined in claim 8, wherein adjacent arcuate segments are mutually tangential.

10. A lighting apparatus comprising:
    at least one light source, the light source having at least one emission surface in a plane and emitting light in directions centered about a centerline;
    a lens positioned with respect to the light source, the lens comprising:
      a reflecting portion having an inner surface and an outer surface, wherein:
        the inner surface comprises a plurality of stepped refracting surfaces parallel to the plane, the plurality of refracting surfaces including at least a first refracting surface and a last refracting surface, the first refracting surface extending from the centerline at a first distance from the plane, each subsequent refracting surface positioned farther from the centerline and farther from the plane; and
        the outer surface comprises at least one curved segment, the at least one curved segment having a first end at the centerline at a selected first lens thickness from the first step and having second end positioned farther from the centerline and farther from the plane than the first end, the second end of the curved segment spaced apart from the last refracting surface of the inner surface by a second lens thickness, the outer surface having at least one curvature selected such that light from the light source incident on the inner surface is refracted by the inner surface and is totally internally reflected by the outer surface and is emitted from the reflecting portion as reflected light;

a refracting portion having an inner surface and an outer surface, the refracting portion extending from the reflecting portion in a first direction away from the centerline and in a second direction toward the plane such that the inner surface faces toward the centerline, the refracting portion receiving the reflected light emitted from the reflecting portion and redirecting the light away from the centerline and away from the plane;

an outer reflector having an inner reflective surface, the inner reflective surface positioned to receive light from the refracting portion of the lens and to reflect the light received from the refracting portion in directions toward the centerline and away from the plane.

11. The lighting apparatus of claim 10 further including a diffuser positioned to receive and diffuse light from the outer reflector.

12. The lighting apparatus of claim 10, wherein the light source comprises a plurality of light-emitting diodes spaced apart longitudinally along a planar lighting module and wherein the light redirecting lens and the outer reflector extend longitudinally parallel to the planar lighting module.

13. The lighting apparatus of claim 10, wherein the lens is rotationally symmetrical about the centerline.

14. The lighting apparatus of claim 13, wherein the outer reflector is rotationally symmetrical about the centerline.

15. A lens for redirecting light from a light source having an emission surface positioned in an emission plane and positioned with respect to a centerline normal to the emission plane, the light source emitting light in an emission pattern with respect to the centerline, the lens comprising:

a reflecting portion positioned with respect to the centerline, the reflecting portion having a first end and a second end, the reflecting lens portion comprising:

an inner surface having a profile comprising a plurality of steps between the first end and the second end of the reflecting portion, a first step proximate to the first end, the first step extending in a first direction away from the centerline at a first distance from the emission plane, each subsequent step positioned farther from the centerline and farther from the emission plane than a preceding step; and an outer surface having a profile comprising at least one curved segment between the first end and the second end of the reflecting portion, the at least one curved segment starting proximate to the centerline at the first end of the reflecting portion at a second distance from the emission plane, the second distance greater than the first distance, the at least one curved segment extending away from the centerline and away from the emission plane toward the second end of the reflecting portion, the at least one curved segment having at least one curvature selected with respect to the inner surface of the reflecting portion to cause light from the light source passing through the steps of the inner surface and incident on the outer surface to incur total internal reflection (TIR) at the outer surface and to be reflected as reflected light in the second direction away from the centerline;

and a refracting portion having a first end proximate to the second end of the reflecting portion and having a second end, the second end of the refracting portion positioned farther from the centerline and closer to the emission plane than the first end of the refracting portion, the refracting portion having a curved inner surface and a curved outer surface, the inner surface and the outer surface of the refracting portion spaced apart, each of inner surface and the outer surface of the refracting portion being concave with respect to the light source, the refracting portion refracting the reflected light from the reflecting portion and directing the light away from the centerline and away from the plane of the light source.

* * * * *